US012647400B2

(12) United States Patent
Gundavelli et al.

(10) Patent No.: US 12,647,400 B2
(45) Date of Patent: Jun. 2, 2026

(54) SOURCE IP PRIVACY IN IDENTIFIER LOCATOR SEPARATION ARCHITECTURES

(71) Applicants: Cisco Technology, Inc., San Jose, CA (US); Dan Lang, San Jose, CA (US)

(72) Inventors: Srinath Gundavelli, San Jose, CA (US); Alberto Rodriguez-Natal, Leon (ES); Fabio R. Maino, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 49 days.

(21) Appl. No.: 18/632,626

(22) Filed: Apr. 11, 2024

(65) Prior Publication Data
US 2025/0323898 A1      Oct. 16, 2025

(51) Int. Cl.
*H04L 9/40* (2022.01)
(52) U.S. Cl.
CPC ........ *H04L 63/0414* (2013.01); *H04L 63/306* (2013.01)
(58) Field of Classification Search
CPC . H04L 63/0414; H04L 63/306; H04L 63/102; H04L 63/0421; H04L 9/321; H04W 12/02
See application file for complete search history.

(56) References Cited

U.S. PATENT DOCUMENTS

| | | | | | |
|---|---|---|---|---|---|
| 8,644,188 | B1 * | 2/2014 | Brandwine | ............. | H04L 41/12 |
| | | | | | 370/254 |
| 8,837,476 | B2 * | 9/2014 | Banavalikar | ............ | H04L 45/72 |
| | | | | | 370/389 |
| 9,276,811 | B1 * | 3/2016 | Brandwine | ........... | H04L 49/354 |
| 9,369,301 | B2 * | 6/2016 | Banavalikar | ........ | H04L 12/4633 |
| 9,438,506 | B2 * | 9/2016 | Ryland | .................... | H04L 47/70 |
| 9,692,713 | B2 * | 6/2017 | Saavedra | ................ | H04L 69/14 |
| 10,057,267 | B1 * | 8/2018 | Miller | .................. | H04L 63/102 |
| 12,126,495 | B2 * | 10/2024 | Cook | .................... | H04L 41/024 |
| 12,177,120 | B2 * | 12/2024 | Brar | ........................ | H04L 45/48 |
| 12,199,865 | B2 * | 1/2025 | Saavedra | .............. | H04L 45/125 |
| 2018/0139133 | A1 | 5/2018 | Makhijani et al. | | |
| 2021/0377208 | A1 | 12/2021 | Xiaopu et al. | | |
| 2022/0272033 | A1 | 8/2022 | Jain et al. | | |

FOREIGN PATENT DOCUMENTS

| | | |
|---|---|---|
| CN | 102238058 A | 1/1900 |
| CN | 102868612 A | 1/2013 |

* cited by examiner

*Primary Examiner* — Hosuk Song
(74) *Attorney, Agent, or Firm* — Lee & Hayes, P.C.

(57)      ABSTRACT

Techniques for protecting source IPs in a network fabric are described. A binding database may receive an indication of an overlay address-to-underlay address binding for a client device connected to the network fabric. The indication is received in a secure message from a fabric edge node through which the client device is connected. The overlay address-to-underlay address binding indicates a first overlay address and an underlay address associated with the fabric edge node. One or more additional overlay addresses are allocated and associated with the overlay address-to-underlay address binding. Each of the one or more additional overlay addresses is mapped to the first overlay address, A second overlay address is assigned, from the one or more additional overlay addresses, to the client device for an IP flow. The fabric edge node intercepts packet of the IP flow and translates a source IP from the first to the second overlay address.

20 Claims, 6 Drawing Sheets

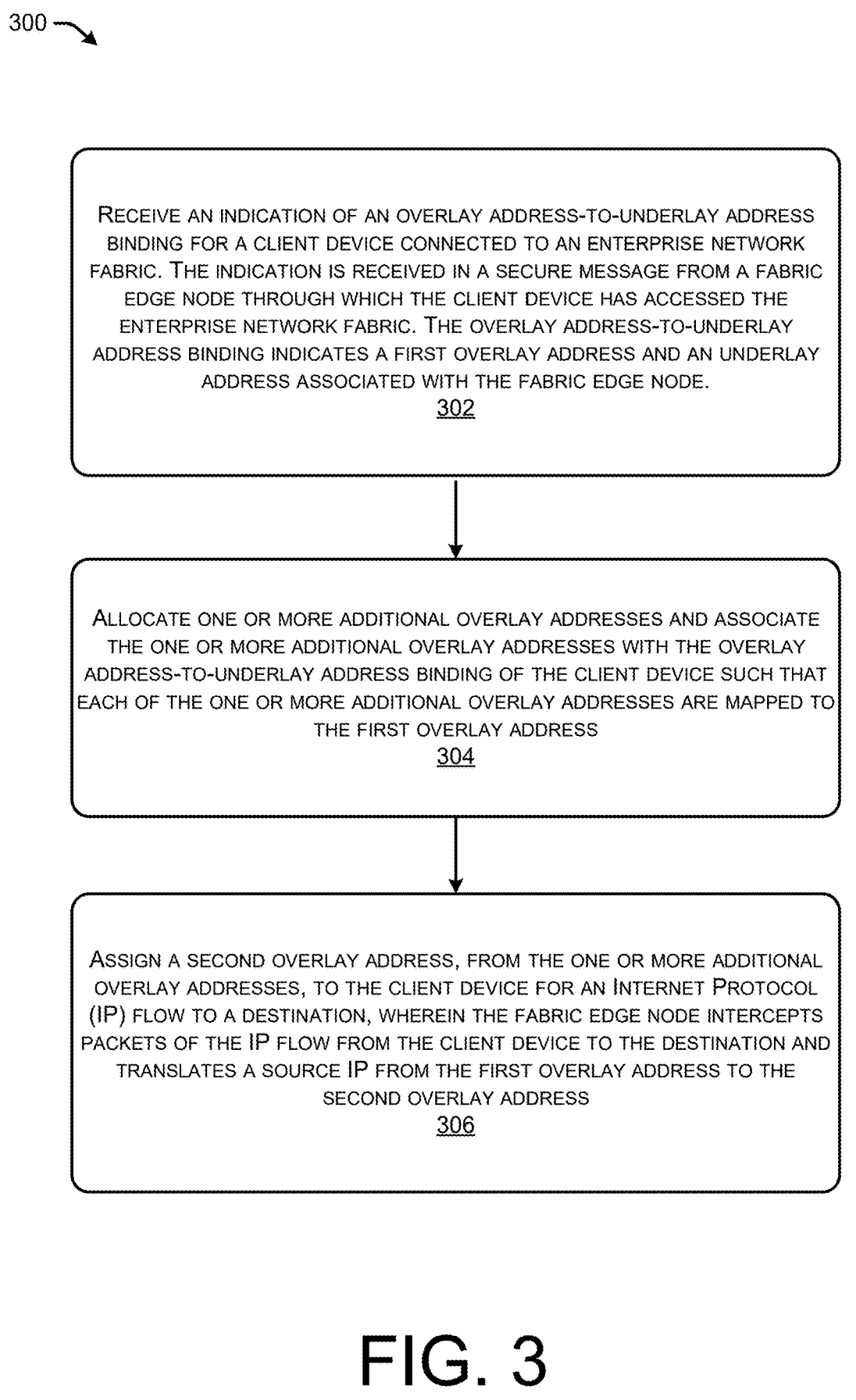

300

RECEIVE AN INDICATION OF AN OVERLAY ADDRESS-TO-UNDERLAY ADDRESS BINDING FOR A CLIENT DEVICE CONNECTED TO AN ENTERPRISE NETWORK FABRIC. THE INDICATION IS RECEIVED IN A SECURE MESSAGE FROM A FABRIC EDGE NODE THROUGH WHICH THE CLIENT DEVICE HAS ACCESSED THE ENTERPRISE NETWORK FABRIC. THE OVERLAY ADDRESS-TO-UNDERLAY ADDRESS BINDING INDICATES A FIRST OVERLAY ADDRESS AND AN UNDERLAY ADDRESS ASSOCIATED WITH THE FABRIC EDGE NODE.
302

ALLOCATE ONE OR MORE ADDITIONAL OVERLAY ADDRESSES AND ASSOCIATE THE ONE OR MORE ADDITIONAL OVERLAY ADDRESSES WITH THE OVERLAY ADDRESS-TO-UNDERLAY ADDRESS BINDING OF THE CLIENT DEVICE SUCH THAT EACH OF THE ONE OR MORE ADDITIONAL OVERLAY ADDRESSES ARE MAPPED TO THE FIRST OVERLAY ADDRESS
304

ASSIGN A SECOND OVERLAY ADDRESS, FROM THE ONE OR MORE ADDITIONAL OVERLAY ADDRESSES, TO THE CLIENT DEVICE FOR AN INTERNET PROTOCOL (IP) FLOW TO A DESTINATION, WHEREIN THE FABRIC EDGE NODE INTERCEPTS PACKETS OF THE IP FLOW FROM THE CLIENT DEVICE TO THE DESTINATION AND TRANSLATES A SOURCE IP FROM THE FIRST OVERLAY ADDRESS TO THE SECOND OVERLAY ADDRESS
306

FIG. 3

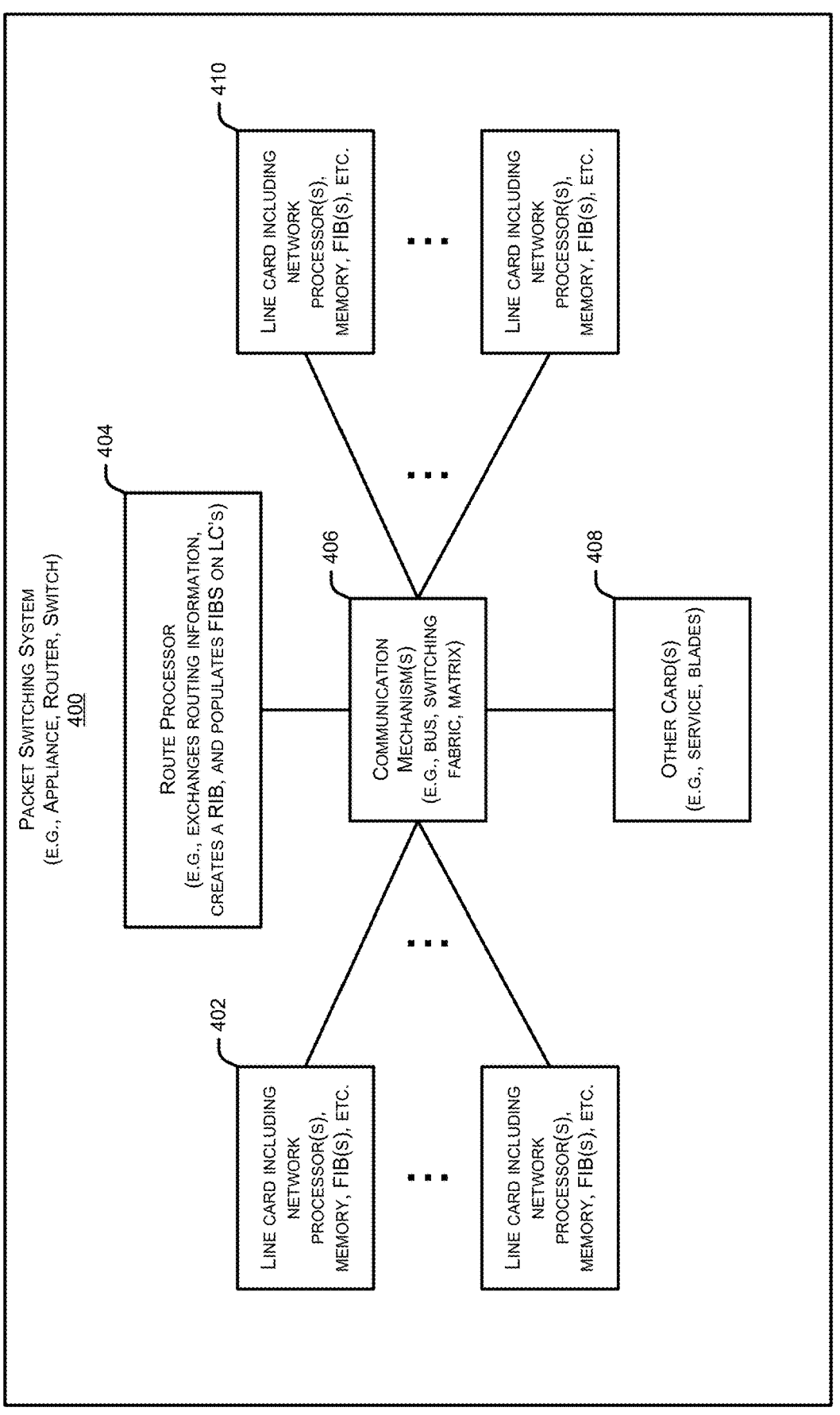

PACKET SWITCHING SYSTEM
(E.G., APPLIANCE, ROUTER, SWITCH)
400

ROUTE PROCESSOR
(E.G., EXCHANGES ROUTING INFORMATION,
CREATES A RIB, AND POPULATES FIBS ON LC'S)
404

LINE CARD INCLUDING
NETWORK
PROCESSOR(S),
MEMORY, FIB(S), ETC.
402

LINE CARD INCLUDING
NETWORK
PROCESSOR(S),
MEMORY, FIB(S), ETC.

COMMUNICATION
MECHANISM(S)
(E.G., BUS, SWITCHING
FABRIC, MATRIX)
406

LINE CARD INCLUDING
NETWORK
PROCESSOR(S),
MEMORY, FIB(S), ETC.
410

LINE CARD INCLUDING
NETWORK
PROCESSOR(S),
MEMORY, FIB(S), ETC.

OTHER CARD(S)
(E.G., SERVICE, BLADES)
408

FIG. 4

SOURCE IP PRIVACY IN IDENTIFIER LOCATOR SEPARATION ARCHITECTURES

TECHNICAL FIELD

The present disclosure relates generally to protecting the identity of a source device by dynamically allocating ephemeral overlay addresses that are visible to an observer but that cannot be correlated to the source device identity.

BACKGROUND

One of the most critical networking issues for enterprise networks today is ensuring that Personally Identifiable Information (PII) of customers and employees stays private. PII is any data that can be used to identify a particular person. Generally, PII is information that can be used on its own or with other information to identify, contact, or locate a particular person. If PII fall into the wrong hands, the PII can be used by malicious entities to steal an identity of a person or commit fraud. It only takes a few pieces of information for a malicious entity to create a false account or sell identities to data brokers. Thus, it is critical for enterprise organizations to keep PII private. In fact, keeping PII is so critical that regulations such as General Data Protection Regulation (GDPR) and California Consumer Privacy Act (CCPA), among others, have been put into place to protect the personal data of online consumers. These regulations require that network operators protect the privacy of users and their personal data, or PII.

An Internet Protocol (IP) address is considered a PII element, as it can be correlated to a device and or a user. An IP header in an IP packet is not encrypted, therefore this PII element can be visible to a malicious observer on a link. The malicious observer may be on an enterprise site, provider network, or in the destination site. The malicious observer may potentially correlate an IP flow to a particular person and/or device, thereby revealing the identity of the person or device, or gathering information about them that may be used for fraudulent activities. Additionally, because the source IP is visibly the same, a malicious observer can correlate two distinct IP flows to a single source. Furthermore, the malicious observer can also correlate the IP address to a LAN segment, which can reveal the location of a user. These threats may result in the loss of privacy of a user.

Thus, there is a need for a mechanism designed to mitigate privacy risk within network environments with minimal deviation from existing network operation and little impact in the system as a whole.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 3 is a flow diagram illustrating an example method associated with the techniques described herein for protecting the identity of a source device by dynamically allocating ephemeral overlay addresses that are visible to an observer but that cannot be correlated to the source device identity.

FIG. 4 illustrates a block diagram illustrating an example packet switching system that can be utilized to implement various aspects of the technologies disclosed herein.

DESCRIPTION OF EXAMPLE EMBODIMENTS

Overview

Figure 1:
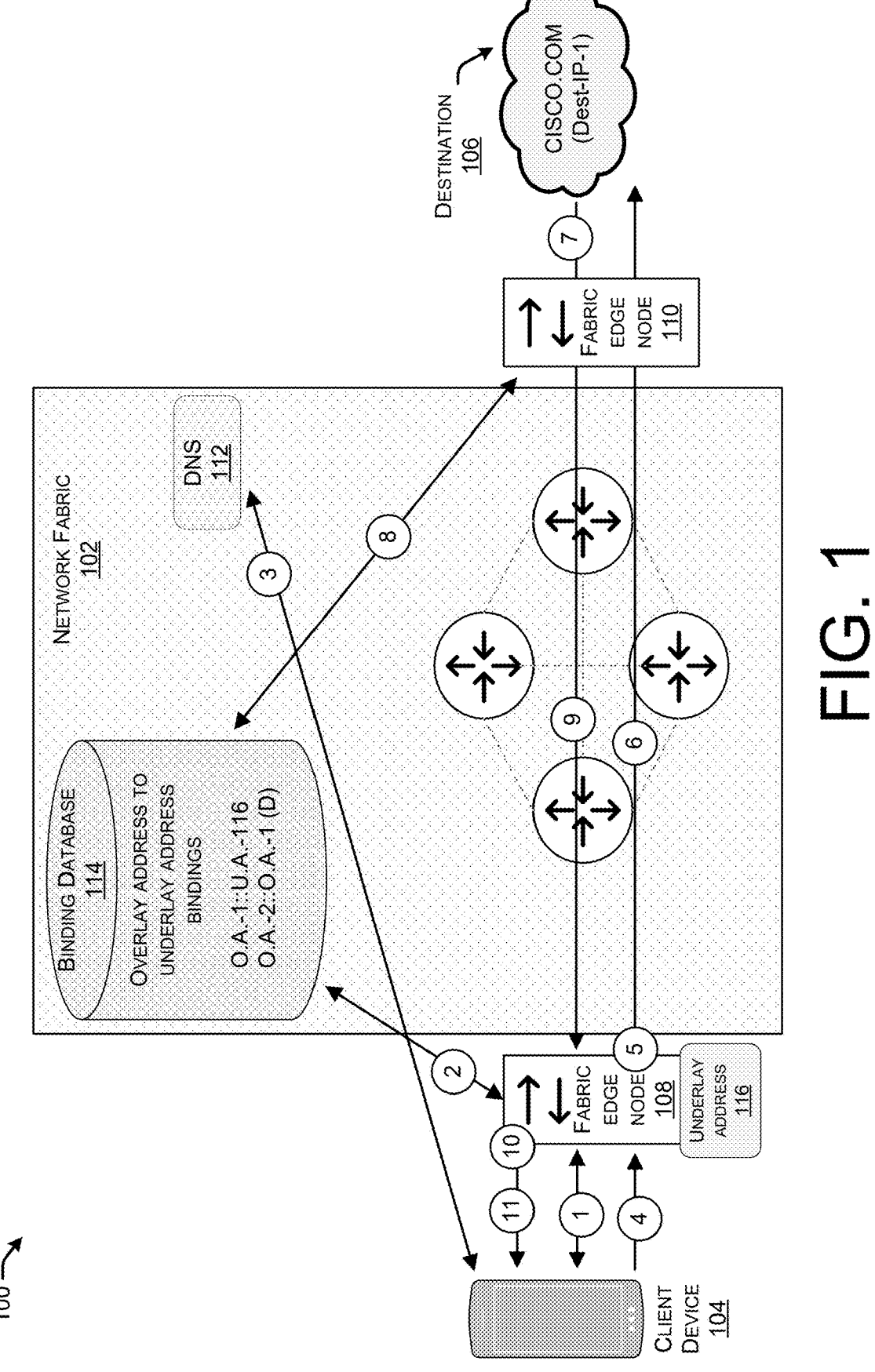
FIG. 1 illustrates an example environment that may implement various aspects of the technologies directed to protecting the identity of a source device by dynamically allocating ephemeral overlay addresses that are visible to an observer but that cannot be correlated to the source device identity.

This disclosure describes a method, performed at least in part by a binding database for protecting the identity of a source device by dynamically allocating temporary or ephemeral overlay addresses that are visible to an observer but that cannot be correlated to the source device identity or an associated user. The method includes receiving an indication of an overlay address-to-underlay address binding for a client device connected to an enterprise fabric, the indication received in a secure message from a fabric edge node through which the client device has accessed the enterprise fabric, the overlay address-to-underlay address binding indicating a first overlay address and an underlay address associated with the fabric edge node. The method also includes allocating one or more additional overlay addresses and associating the one or more additional overlay addresses with the overlay address-to-underlay address binding of the client device such that each of the one or more additional overlay addresses are mapped to the first overlay address. Finally, the method includes assigning a second overlay address, from the one or more additional overlay addresses, to the client device for an Internet Protocol (IP) flow to a destination, wherein the fabric edge node intercepts packet of the IP flow from the client device to the destination and translates a source IP from the first overlay address to the second overlay address.

Additionally, the techniques described herein may be performed by a system and/or device having non-transitory computer-readable media storing computer-executable instructions that, when executed by one or more processors, performs the method described above.

EXAMPLE EMBODIMENTS

As described above, in today's networking environments, it is critically important to preserve the privacy of Personally Identifiable Information, or PII. One increasingly popular approach for assisting in preserving the privacy of a source Internet Protocol (IP) address is to implement an architecture that separates identity and location. That is, an architecture that separates the identity (the identity of a client or host endpoint device) and location (the location of the client or host endpoint device in the network) functions of an IP address. In such architectures, the identity of a client device always stays the same, however, the location will change as a user and device change location. For example, in some enterprise fabric architectures, Locator ID Separation Protocol (LISP), where an overlay address is assigned to a client device and an underlay address is assigned to a router that is used to reach the client device with the assigned overlay address, is used for mobility management. In short, LISP is a tunneling protocol that uses a Domain Name System (DNS) like system to figure out to which router an IP packet should be sent. An overlay address represents device identity and is often the IP address of an endpoint device and is a stable element. An underlay address refers to the IP address of the current network attachment point. A binding database of a binding system maintains overlay address-to-underlay address bindings. Any forwarding entity can find the location of an overlay address by querying the binding database. A client device with an overlay address, as it roams in a LISP network can always be located by querying the binding database. A tunnel router encapsulates IP packets as they are sent from the client device, and de-encapsulates encapsulated IP packets that are sent to the client device. By implementing an architecture that separates the identity and location functions of an IP address a malicious observer in a network may not see the IP address of an endpoint client device. However, the overlay address of the client device is typically stable (i.e., does not change) and is anchored to the underlay address of the fabric edge node, thus, the information visible to a malicious observer may still assist the malicious observer in fraudulent activities as the client device can be identified by its stable overlay address and a location of the client device in a network can be determined from the underlay address of the fabric edge node the overlay address is anchored to.

This disclosure is directed to techniques for protecting the identity of a source device by dynamically allocating temporary or ephemeral overlay addresses that are visible to an observer but that cannot be correlated to the source device identity. In an enterprise fabric that separates identity from location of a client device, ephemeral overlay addresses are dynamically allocated on a potentially per flow basis. In one instantiation, the network allocates these ephemeral overlay addresses for each newly created IP flow, and to any potential observers, all that is visible is the ephemeral overlay address which cannot by correlated to the client device identifier or the stable overlay address. In some examples, ephemeral overlay addresses may only be allocated to certain IP flow (e.g., when particularly sensitive information is involved). In other instances, ephemeral overlay addresses may be reused across a subset of flows. Thus, ephemeral overlay address allocation may be tuned based on availability and performance impact. These techniques improve the privacy of endpoints, as the actual stable overlay address associated with a user or device, is never carried over the enterprise network that interconnects the attachment points.

To implement techniques described herein, when a client device with an assigned stable overlay address attaches to an enterprise fabric network at a fabric edge node, the fabric edge node sends a message to the binding database to update and register the overlay address-to-underlay address binding in the binding database. The message is a secure registration message protected using Hypertext Transfer Protocol Secure (HTTPS) encryption, thus, the binding between the stable overlay address and underlay address is known only to the binding database and the fabric edge node, and not visible to potential attackers observing the traffic on the enterprise network. When the client device initiates an IP flow, for example to the destination Cisco.com, the client device does Fully Qualified Domain Name (FQDN) resolution for the destination, Cisco.com. Domain Name System (DNS) returns a record for the FQDN, with the destination IP address. Thus, the IP flow between the stable overlay address of the client device and the IP address of Cisco.com is initiated.

When the client device transmits IP packets to Cisco.com, the IP packets are intercepted by the fabric edge node function of an access switch or router that translates the source IP, which is the stable overlay address of the client device, to an ephemeral overlay address that is allocated for the flow between the client device and Cisco.com by the binding database. Thus, to a potential malicious observer, the IP flow appears to be between a client device with the ephemeral overlay address and Cisco.com (note, the destination IP address is unchanged). Additionally, the prefix associated with the ephemeral overlay address is not topologically anchored on the access switch, instead it is from an ephemeral overlay address set or group of one or more ephemeral overlay addresses with no IP anchoring. This ephemeral overlay address set can be composed of one or more IP blocks, IP prefixes, or collection of IPs that are put aside in the fabric and only used for the purpose of this privacy feature. The ephemeral overlay address set is not hosted on any ingress nodes. However, there needs to be a route externally for this ephemeral overlay address set towards the site border router. With this approach, the client device can roam in the network fabric and the ephemeral overlay address assigned for a flow will still be routable to the current location of the client device. The new fabric edge node upon updating the binding database with its underlay address for the overlay address, can perform ephemeral overlay address to stable overlay address translation. Thus, translation state is not tied to any single node.

With respect to the ephemeral overlay address management, the binding database does the ephemeral overlay address allocation. When the fabric edge node updates the binding database with the overlay address-to-underlay address binding (with the stable overlay address of the client device) the binding database can proactively allocate a set of ephemeral overlay addresses and associate them to the overlay address-to-underlay address binding. Thus, the ephemeral overlay address and the stable overlay address resolve to the same underlay address, as the underlay address is mapped to the stable overlay address and the stable overlay address is mapped to the ephemeral overlay address for the IP flow between the client device and Cosco.com. In some examples, in the binding database, the ephemeral overlay address is marked as such, and the ephemeral overlay address has a binding database entry binding the ephemeral overlay address with the stable overlay address. In other examples, the ephemeral overlay address may not be marked as being "ephemeral" and instead treated as a regular, or stable, overlay address, each with an overlay address-to-underlay address binding, instead of an entry in the binding database associating the stable overlay address to the ephemeral overlay address. This approach may require more space in a binding database but might reduce lookup time and ease incremental deployment of the solution.

After the IP packet is intercepted by the fabric edge node and the stable overlay address translated to the ephemeral overlay address, the packet is routed from the fabric edge node towards the destination (Cisco.com in this example). In some examples a Policy Based Routing (PBR) rule is inserted for intercepting the packets belonging to this flow. In other examples, alternate mechanisms to intercept the packets, and/or not capture all flows, may be instantiated. Thus, all other packets for the destination Cisco.com and having the stable overlay address as a source are intercepted and the stable overlay address translated to the ephemeral overlay address as the source before being routed to the destination.

Packets that are returned from the destination, Cisco.com, to the client device are sent with the IP address of Cisco.com as the source and the ephemeral overlay address as the destination. The aggregate route for the ephemeral overlay address space will steer the packet to the site border router. The fabric boarder node does a binding database query, and the binding database replies with the overlay address mapping (ephemeral overlay address-to-underlay address), since the boarder router can consume the mapping as if it is a regular mapping. This requires no changes on the border router. In an alternate instantiation, the binding database may respond with two underlay address entries, the ephemeral overlay address to the stable overlay address, and the stable overlay address to the underlay address. On checking the marking, ephemeral overlay address, the border router resolves ephemeral overlay address to stable overlay address, and stable overlay address to underlay address. The packet is then routed to the access fabric edge node with the appropriate underlay address, which has the translation rule for the ephemeral overlay address to the stable overlay address mapping. The destination is changed from the ephemeral overlay address to the stable overlay address and the packet is forwarded to the client device.

In conventional solutions that attempt to ensure the privacy of a source IP address to ensure malicious entities cannot participate in fraudulent activities against the user and/or client device, as well as solutions that comply with privacy regulations, the solutions typically require the client device to actively participate in the privacy mechanisms. For example, the client device must coordinate with the various LISP elements, such as with the mapping system, in order to protect the source IP address. In other examples, the client itself will take measures to hide its own source IP address. However, by using the techniques described herein for protecting the privacy of a source IP address, the client device, or source itself, does not have to take any additional measures to ensure source IP address privacy. That is, the techniques described herein are device agnostic and can be implemented without any requirements applied to the source, thus, these techniques are completely transparent to the client. Therefore, regardless of client device vendor, hardware version, software version, etc., the privacy of the source IP address can be assured. Additionally, because the ephemeral overlay addresses can be allocated per flow (although they are not required to be per flow), with each flow from a particular source having a different ephemeral overlay address, a malicious observer cannot correlate network activity from a particular person or device back to that person or device. Furthermore, because the techniques described herein are based on an architecture that separates identity and location, the ephemeral overlay address is not anchored to a specific network device, thus ensuring client device mobility in the network. In other words, the client device can roam freely in the network fabric and the ephemeral overlay address assigned for the flow will still be routable to the current location of the client device. The border router upon updating the binding database with its underlay address for the ephemeral overlay address can translate the ephemeral overlay address to the stable overlay address, thus the translation state is not tied to any single node.

FIG. 1 illustrates an example environment 100 that may implement various aspects of the technologies directed to protecting the identity of a source device by dynamically allocating ephemeral overlay addresses that are visible to an observer but that cannot be correlated to the source device identity. Environment 100 includes a network fabric 102. For example, the network fabric 102 may be a software defined fabric architecture that facilitates data communication between a source connected within the network fabric and a destination. Example environment 100 also include a client device 104 connected wirelessly to the network fabric 102. The client device 104 may connect to the network fabric 102 to communicate with a destination 106. For example, environment 100 illustrates the client device 104 as a source device communicating with Cisco.com, the destination 106, using the network fabric 102. The network fabric 102 may include multiple network devices that make up the fabric, such as routers, switches, access points, gateways, etc. Environment 100 illustrates several network devices, among them are fabric edge nodes 108 and fabric edge node 110. fabric edge node 108 and fabric edge node 110 may each be an access-switch or an edge border router that serve as both an ingress tunnel router as well as an egress tunnel router in the network fabric 102 for example. The network fabric 102 in environment 100 also includes a Domain Name System (DNS) resolver 112 for converting the domain name of a destination (e.g., Cisco.com) into a destination IP address. The network fabric 102 also includes a binding database 114. The binding database 114 may be part of a mapping system for a Location ID Separation Protocol (LISP) infrastructure, the mapping system may also include a map resolver (not shown). The binding database 114 stores Endpoint Identifier to Routing Locator (overlay address-to-underlay address) bindings for endpoint devices such as client device 104. In addition, the binding database 114 allocates ephemeral overlay addresses and may associate one or more ephemeral overlay addresses to overlay address-to-underlay address bindings.

An example implementation process for protecting the identity of a source device by dynamically allocating ephemeral overlay addresses that are visible to an observer but that cannot be correlated to the source device is illustrated in FIG. 1. At (1) the client device 104, with an assigned overlay address (e.g., the IP address of client device 104) of overlay address-1 is attached to the access network fabric 102. The assigned overlay address-1 of client device 104 is a stable overlay address and can potentially be used to reveal the identity or identifying information about a user of the client device 104 that may be used to facilitate fraudulent of malicious activities directed at the user of client device 104 by a malicious entity observing network activity. The malicious observer may be on the enterprise site, provider network, in the destination site, etc. Because the stable overlay address-1 may be the IP address of client device 104, it is considered PII and its privacy must be protected. The client device 104 accesses the network fabric at fabric edge node 108. In this example fabric edge node 108 is an access-switch that serves as both an ingress tunnel router as well as an egress tunnel router.

At (2) fabric edge node 108 updates the overlay address-to-underlay address binding in the binding database 114. The overlay address-to-underlay address binding is overlay address-1 to underlay address 116. Underlay address 116 is the underlay address associated with fabric edge node 108 and is used to reach overlay address-1. The overlay address-to-underlay address binding of overlay address-1::underlay address-116 is registered as shown in the binding database. The registration message sent from fabric edge node 108 to the binding database 114 is protected using HTTPS encryption, henceforth the binding between overlay address-1 and underlay address 116 is known only to the binding system and fabric edge node 108. A potential attacker or fraudulent entity observing the traffic on the network fabric cannot see the overlay address-1::underlay address-116 binding. The Binding database 114 manages ephemeral overlay address allocation. Thus, when fabric edge node 108 updates the binding database 114 with the overlay address-1::underlay address-116 binding, the binding database can proactively allocate a set of one or more dynamic or ephemeral overlay addresses and associate them to the overlay address-1 to underlay address 116 binding. As illustrated in FIG. 1, the binding database 114 has allocated overlay address-2 as an ephemeral overlay address associated with the overlay address-1::underlay address-116 binding. As such the binding database registers an entry in the database showing that the ephemeral overlay address-2 is associated with the stable overlay address-1 as shown in the entry overlay address-2:: overlay address-1 (D). The indication that the overlay address-2 is ephemeral, or dynamic is indicated as (D) in the database entry. Thus, overlay address-2 and overlay address-1 both resolve to the same underlay address, underlay address 116, as overlay address-2 resolves to the assigned overlay address-1 which resolves to underlay address 116 of fabric edge node 108. Alternately, the binding database 114 may not mark overlay addresses as ephemeral or dynamic, and just treat ephemeral overlay addresses as regular stable overlay addresses are treated, each with an overlay address-to-underlay address binding. Although not illustrated, instead of the binding entry overlay address-2:: overlay address-1, the binding would be overlay address-2:: underlay address-116. This approach may require more space in the binding database, as overlay address-1 may be associated with multiple ephemeral overlay addresses. However, this approach may reduce lookup time and ease incremental deployment of the techniques described herein.

At (3) the client device 104, as part of initiating a new IP flow, does FQDN resolution for the destination 106, Cisco.com. DNS returns a record for the FQDN, with the destination of IP address Dest-IP-1. At (4) the client device 104 initiates anew IP flow {overlay address-1<->Dest-IP-1} and sends IP packets with overlay address-1 as the source identity to fabric edge node 108. At (5) the fabric edge node 108 with underlay address 116 intercepts packets in the IP flow for the destination Dest-IP-1. fabric edge node 108 translate overlay address-1 (which may be the source IP address) to overlay address-2, the destination IP address remains unchanged. Thus, packets in the flow will appear to have an overlay address of overlay address-2 to an observer in the network fabric. All IP packets for the destination, Dest-IP-1, and having overlay address-1 as the source are translated to overlay address-2 as the source identity at fabric edge node 108. The prefix associated with overlay address-2 is not topologically anchored on fabric edge node 108. overlay address-2 may be from an ephemeral overlay address set (e.g., overlay address-2 through overlay address-7) with no IP anchoring. This overlay address set can be composed of one or more IP blocks, IP prefixes, or collection of IPs that are put aside or reserved in the network fabric and only used for the purpose of this dynamically allocated privacy feature. This overlay address set is not hosted on any ingress nodes. However, there needs to be a route externally for this ephemeral overlay address set towards the site border router. In some embodiments, a Policy-Based Routing (PBR) rule may be inserted for intercepting packets that belong to the IP flow. Alternately, other mechanisms may be used to intercept the packets, and/or not capture all flow, etc.

At (6) the IP flow packet with the overlay address that has been translated from overlay address-1 to overlay address-2, {overlay address-2<->Dest-IP-1}, is routed through the network fabric 102 towards the destination, Cisco.com. At (7) return packets from the destination 106 are sent as {Dest-IP-1<->overlay address-2}. The aggregate route for the overlay address-2 space will steer the packet to the site border router or fabric edge node 110. At (8) fabric edge node 110 does a binding database query. The binding database replies with the overlay address binding, overlay address-2 to underlay address-116 (overlay address-2 resolves to overlay address-1 which resolves to underlay address-116) since fabric edge node 110 can consume the binding as if it is a regular binding. Thus, there are no special hardware or software requirements on the boarder router in order for the border router to implement the techniques described here. At (9) the packet is routed to fabric edge node 108 with underlay address 116. At (10) fabric edge node 108 has the translation rule for the overlay address-2 to overlay address-1 binding and changes the destination of the return packet to overlay address-1, the IP address of client device 104. At (11) fabric edge node 108 forwards the packet to client device 104.

Figure 2:
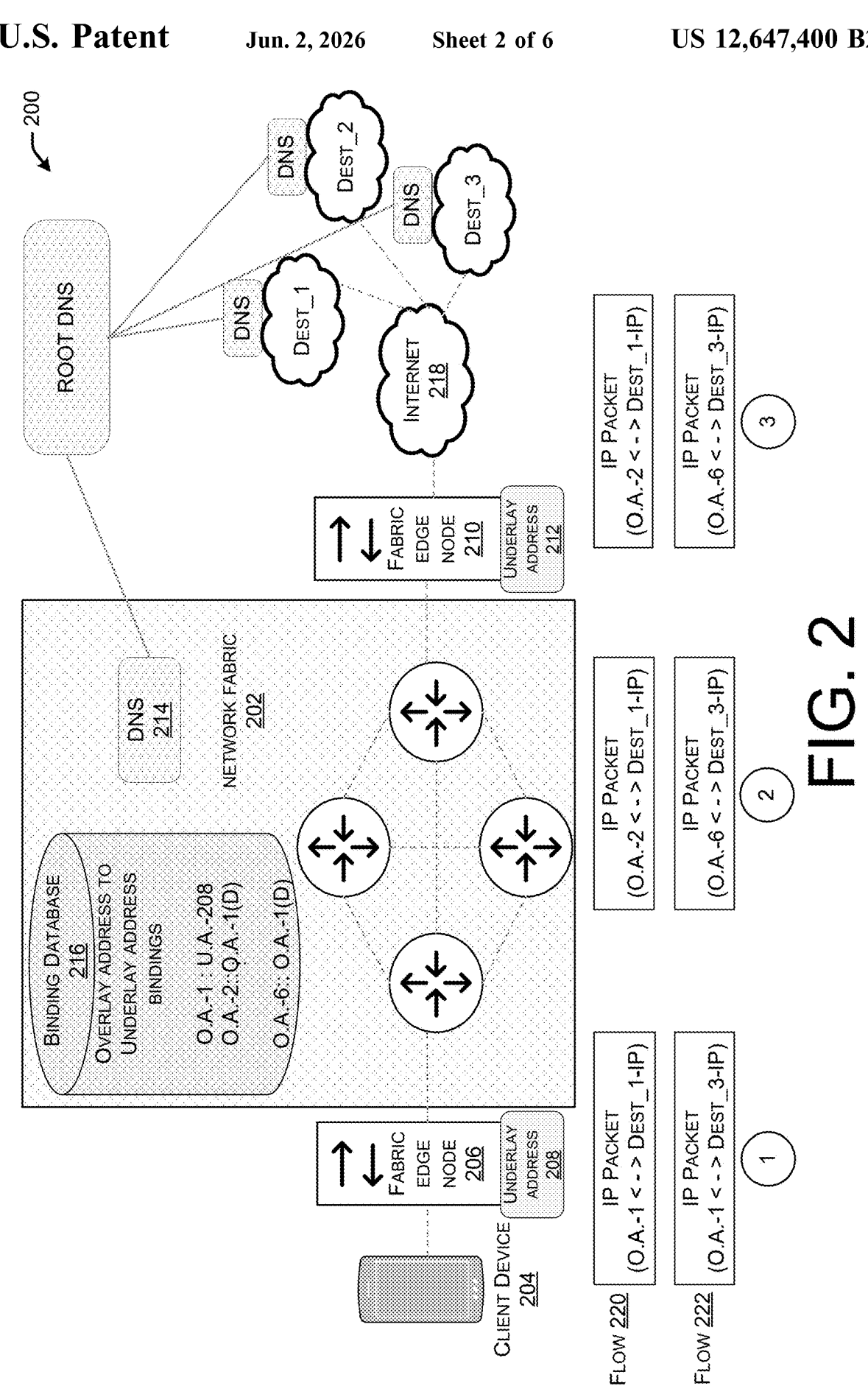
FIG. 2 illustrates an example environment that may implement various aspects of the technologies directed to protecting the identity of a source device by dynamically allocating unique ephemeral overlay addresses per IP flow that are visible to an observer but that cannot be correlated to the source device identity.

FIG. 2 illustrates an example environment 200 for implementing various aspects of the technologies directed to protecting the identity of a source device by dynamically allocating unique dynamic ephemeral overlay addresses per IP flow that are visible to an observer but that cannot be correlated to the source device identity. Environment 200 includes a network fabric 202. The enterprise fabric may be an enterprise network that a client device 204 connects to. Although illustrated as a smartphone, the client device 204 may be any kind of endpoint device that needs to connect to the network fabric 202 such as workstation, desktop computer, laptop, tablet, network appliance, e-reader, or other computing device. The network fabric 202 may include multiple network devices that make up the fabric, such as routers, switches, etc. For example, environment 200 includes fabric edge node 206 with an associated underlay address 208 and fabric edge node 210 with associated underlay address 212. fabric edge node 206 and fabric edge node 210 may each be an access-switch that serves as both an ingress tunnel router as well as an egress tunnel router in the network fabric 202. Similar to environment 100 in FIG. 1, environment 200 also includes a DNS system (e.g., DNS resolver and root DNS server), DNS 214, converting the domain name of a destination (the example destinations in environment 200 have domain names dest_1, dest_2, and dest_3) into a destination IP address. Network fabric 202 also includes a binding database 216 similar to the binding database 114 described with reference to FIG. 1. Environment 200 also includes the internet 218 over with the client device 204 in the network fabric 202 communicates with a destination. Environment 200 also include two IP flows, flow 220 and flow 222. Flow 220 and flow 222 are IP flows initiated from a source, client device 204, to two different destinations, dest_1 and dest_3 respectively.

Environment 200 illustrates an example implementation of techniques described herein for dynamically allocating multiple ephemeral overlay addresses to a same source. For each separate IP flow, a different ephemeral overlay address may be allocated. Thus, flow 220 and flow 222 cannot be correlated back to the identity of client device 204 by a malicious observer. Similar to the process described with reference to FIG. 1, fabric edge node 206 updates the assigned overlay address-to-underlay address binding for client device 204 in binding database 216. If client device 204 has an overlay address of overlay address-1, the overlay address-to-underlay address binding will be overlay address-1::underlay address-208, as illustrated in the binding database 216. overlay address-1 of client device 104 is a stable overlay address (e.g., the IP address of client device 204) and can potentially be used to reveal the identity of, or identifying information about, a user associated with client device 204. Also illustrated in environment 200, binding database 216 has allocated the set of ephemeral overlay addresses, overlay address-2 through overlay address-6, and associated them with the overlay address-1 to underlay address-208 binding. As such the binding database 216 registers entries in the database showing that the ephemeral overlay addresses are associated with the stable overlay address-1, for example overlay address-2::overlay address-1 (D) through overlay address-6::overlay address-1 (D) indicates that overlay address-2 through overlay address-6 are dynamic ephemeral overlay addresses allocated to overlay address-1, the identity of client device 204. Thus, the set of ephemeral overlay addresses, overlay address-2 through overlay address-6, all resolve to the same underlay address, underlay address 208, as overlay address-2 through overlay address-6 resolve to overlay address-1 which resolves to underlay address 208 of fabric edge node 206.

When client device 204 initiates flow 220 to destination dest_1, DNS returns with dest_1-IP, the IP address of dest_1. Thus, the source to destination of flow 220 is {overlay address-1<->dest_1-IP}, as shown in the IP packet at (1). The fabric edge node 206 with underlay address 208 intercepts IP packets in flow 220 and translates overlay address-1, which is the identity of client device 204 and may be the IP address of client device 204, to overlay address-2. The destination IP address, dest_1-IP, remains unchanged. Thus, packets in flow 220 will appear to have a source overlay address of overlay address-2 to an observer in network fabric 202 as shown at (2). The IP packets in flow 220 with the translated overlay address {overlay address-2<->dest_1-IP}, are routed to the destination, dest_1, over the internet 218 as shown at (3). Again, to any potentially malicious observers, flow 220 will appear to have a source identity of overlay address-2.

When client device 204 initiates another IP flow to a different destination, flow 222 to dest_3, a similar process occurs. At (1) the IP packet is sent with a source overlay address of overlay address-1 to a destination IP address of dest_3-IP, {overlay address-1<->dest_3-IP}. IP packets in flow 222 are intercepted by fabric edge node 206 where the overlay address is translated from stable overlay address-1 to ephemeral overlay address-6. Thus, at (2) the packets in flow 222 will appear to have a source overlay address of overlay address-6 to an observer in network fabric 202. At (3) the IP packets in flow 222 with the translated overlay address {overlay address-6<->dest_3-IP}, are routed to the destination, dest_3, over the internet 218. Thus, Flow 220 and flow 222 appear to any potential observers to have different sources that cannot be correlated back to client device 204 or a user associated with client device 204, as each flow has a different ephemeral overlay address associated with it.

FIG. 3 is a flow diagram illustrating an example method 300 associated with the techniques described herein for protecting source IP privacy in enterprise fabric environments. Example method 300 illustrates aspects of the functions performed by the binding database 114 as described with reference to FIG. 1. The logical operations described herein with respect to FIG. 3 may be implemented (1) as a sequence of computer-implemented acts or program modules running on a computing system and/or (2) as interconnected machine logic circuits or circuit modules within the computing system. In some examples, the method(s) 300 may be performed by a system comprising one or more processors and one or more non-transitory computer-readable media storing computer-executable instructions that, when executed by the one or more processors, cause the one or more processors to perform the method(s) 300.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIG. 3 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

At operation 302 a binding database receives an indication of an Endpoint Identifier to Routing Locator (overlay address-to-underlay address) binding for a client device connected to a software defined network fabric. The indication is received in a secure message from a fabric edge node through which the client device has accessed the enterprise fabric. The overlay address-to-underlay address binding indicates a first overlay address and an underlay address associated with the fabric edge node. For example, with reference to FIG. 1 at (2) the binding database 114 receives the overlay address-to-underlay address binding for the client device 104 that is connected to the network fabric 102 from the fabric edge node 108. The overlay address in the overlay address-to-underlay address binding is a stable overlay address, for example, the IP address of client device 104. The binding database 114 registers the overlay address-to-underlay address binding of overlay address-1::underlay address-116. The overlay address-to-underlay address binding is received in a registration message sent from the fabric edge node 108 and is protected using HTTPS encryption, henceforth the binding between overlay address-1 and underlay address 116 is known only to the binding system and fabric edge node 108. A potential attacker or fraudulent entity observing the traffic on the network fabric 102 cannot see the overlay address-1::underlay address-116 binding.

At operation 304 the binding database allocates one or more additional overlay addresses and associates the one or more additional overlay addresses with the overlay address-to-underlay address binding of the client device such that each of the one or more additional overlay addresses is mapped to the first overlay address. For example, with reference to FIG. 1 the binding database 114 manages ephemeral overlay address allocation, thus, when fabric edge node 108 updates the binding database 114 with the overlay address-to-underlay address binding for client device 104 as described above, the binding database 114 can proactively allocate a set of one or more ephemeral overlay addresses and associate them to the overlay address-1 to underlay address 116 binding. With reference to FIG. 2, the binding database 216 has allocated a block of more than one ephemeral overlay addresses and associated the block of overlay addresses to the overlay address-to-underlay address binding.

At operation 306 the binding database assigns a second overlay address, from the one or more additional overlay addresses, to the client device for an Internet Protocol (IP) flow to a destination, wherein the fabric edge node intercepts packets of the IP flow from the client device to the destination and translates a source IP from the first overlay address to the second overlay address. For example, with reference to FIG. 1 binding database 114 has assigned overlay address-2 to overlay address-1. Fabric edge node 108 intercepts IP flow packets from client device 104 and translates the source overlay address from overlay address-1 to overlay address-2, the destination remains unchanged. In this way, a potentially malicious observer will only see overlay address-2 as a source overlay address which cannot be correlated back to client device 104. With reference to FIG. 2, binding database 216 has allocated a block of ephemeral overlay addresses, overlay address-2 through overlay address-6, to overlay address-1. The block of ephemeral overlay addresses may be assigned per flow as depicted in flow 220 and flow 222.

FIG. 4 illustrates a block diagram illustrating an example packet switching device (or system) 400 that can be utilized to implement various aspects of the technologies disclosed herein. In some examples, packet switching device(s) 400 may be employed in various networks, such as, for example, fabric edge node 108 and fabric edge node 110 of network fabric 102 described with respect to FIG. 1.

In some examples, a packet switching device 400 may comprise multiple line card(s) 402, 410, each with one or more network interfaces for sending and receiving packets over communications links (e.g., possibly part of a link aggregation group). The packet switching device 400 may also have a control plane with one or more processing elements for managing the control plane and/or control plane processing of packets associated with forwarding of packets in a network. The packet switching device 400 may also include other cards 408 (e.g., service cards, blades) which include processing elements that are used to process (e.g., forward/send, drop, manipulate, change, modify, receive, create, duplicate, apply a service) packets associated with forwarding of packets in a network. The packet switching device 400 may comprise hardware-based communication mechanism 406 (e.g., bus, switching fabric, and/or matrix, etc.) for allowing its different entities, line cards 402, 404, 408 and 410 to communicate. Line card(s) 402, 410 may typically perform the actions of being both an ingress and/or an egress line card 402, 410, in regard to multiple other particular packets and/or packet streams being received by, or sent from, packet switching device 400.

Figure 5:
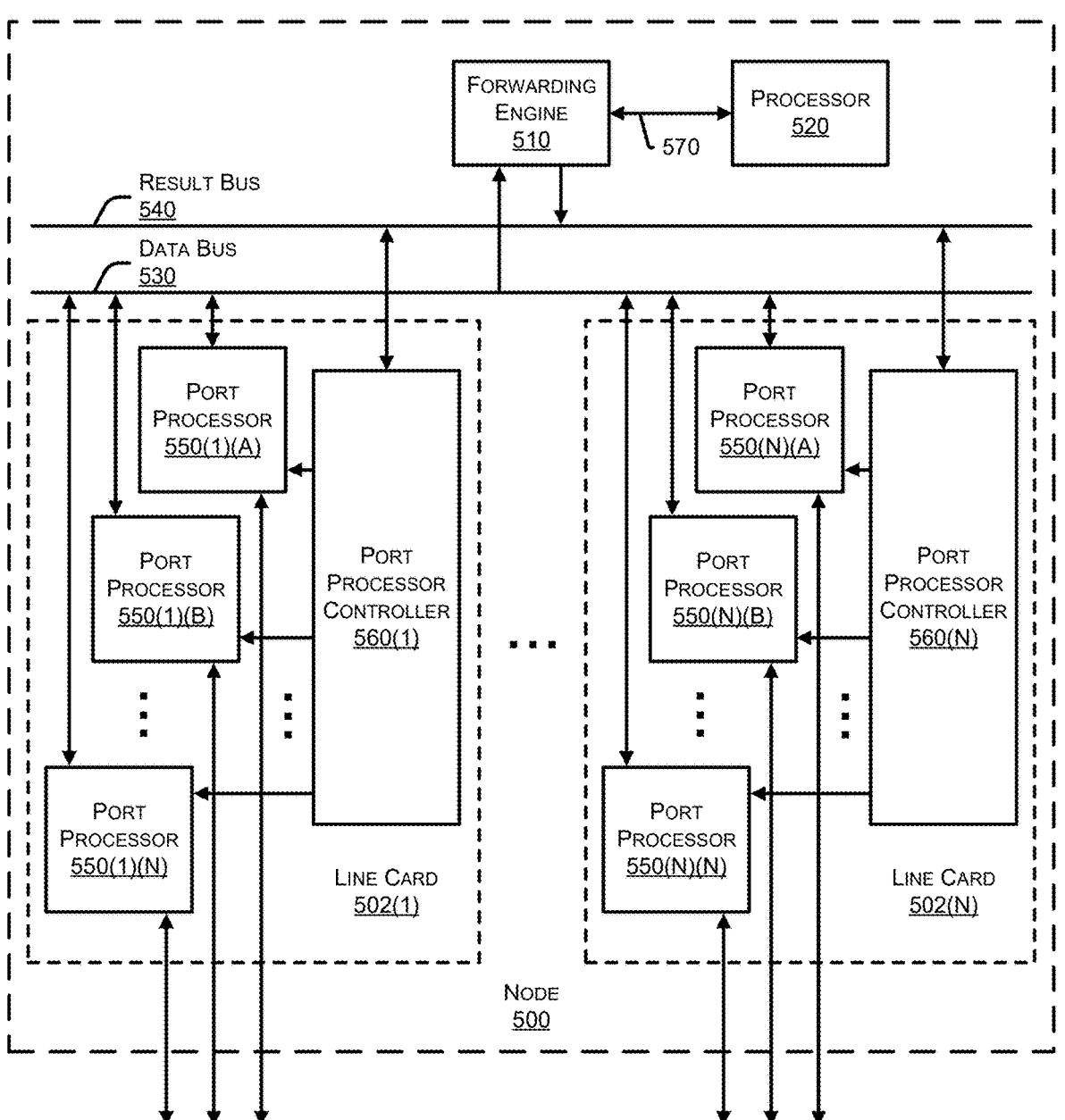
FIG. 5 illustrates a block diagram illustrating certain components of an example node that can be utilized to implement various aspects of the technologies disclosed herein.

FIG. 5 illustrates a block diagram illustrating certain components of an example node 500 that can be utilized to implement various aspects of the technologies disclosed herein. In some examples, node(s) 500 may be employed in various networks, such as, for example the network fabric 102, fabric edge node 108, and fabric edge node 110 as described with respect to FIG. 1.

In some examples, node 500 may include any number of line cards 502 (e.g., line cards 502(1)-(N), where N may be any integer greater than 1) that are communicatively coupled to a forwarding engine 510 (also referred to as a packet forwarder) and/or a processor 520 via a data bus 530 and/or a result bus 540. Line cards 502(1)-(N) may include any number of port processors 550(1)(A)-(N)(N) which are controlled by port processor controllers 560(1)-(N), where N may be any integer greater than 1. Additionally, or alternatively, forwarding engine 510 and/or processor 520 are not only coupled to one another via the data bus 530 and the result bus 540, but may also communicatively coupled to one another by a communications link 570.

The processors (e.g., the port processor(s) 550 and/or the port processor controller(s) 560) of each line card 502 may be mounted on a single printed circuit board. When a packet or packet and header are received, the packet or packet and header may be identified and analyzed by node 500 (also referred to herein as a router) in the following manner. Upon receipt, a packet (or some or all of its control information) or packet and header may be sent from one of port processor(s) 550(1)(A)-(N)(N) at which the packet or packet and header was received and to one or more of those devices coupled to the data bus 530 (e.g., others of the port processor(s) 550(1)(A)-(N)(N), the forwarding engine 510 and/or the processor 520). Handling of the packet or packet and header may be determined, for example, by the forwarding engine 510. For example, the forwarding engine 510 may determine that the packet or packet and header should be forwarded to one or more of port processors 550(1)(A)-(N)(N). This may be accomplished by indicating to corresponding one(s) of port processor controllers 560(1)-(N) that the copy of the packet or packet and header held in the given one(s) of port processor(s) 550(1)(A)-(N)(N) should be forwarded to the appropriate one of port processor(s) 550(1)(A)-(N)(N). Additionally, or alternatively, once a packet or packet and header has been identified for processing, the forwarding engine 510, the processor 520, and/or the like may be used to process the packet or packet and header in some manner and/or may add packet security information in order to secure the packet. On a node 500 sourcing such a packet or packet and header, this processing may include, for example, encryption of some or all of the packets or packet and header's information, the addition of a digital signature, and/or some other information and/or processing capable of securing the packet or packet and header. On a node 500 receiving such a processed packet or packet and header, the corresponding process may be performed to recover or validate the packets or packet and header's information that has been secured.

Figure 6:
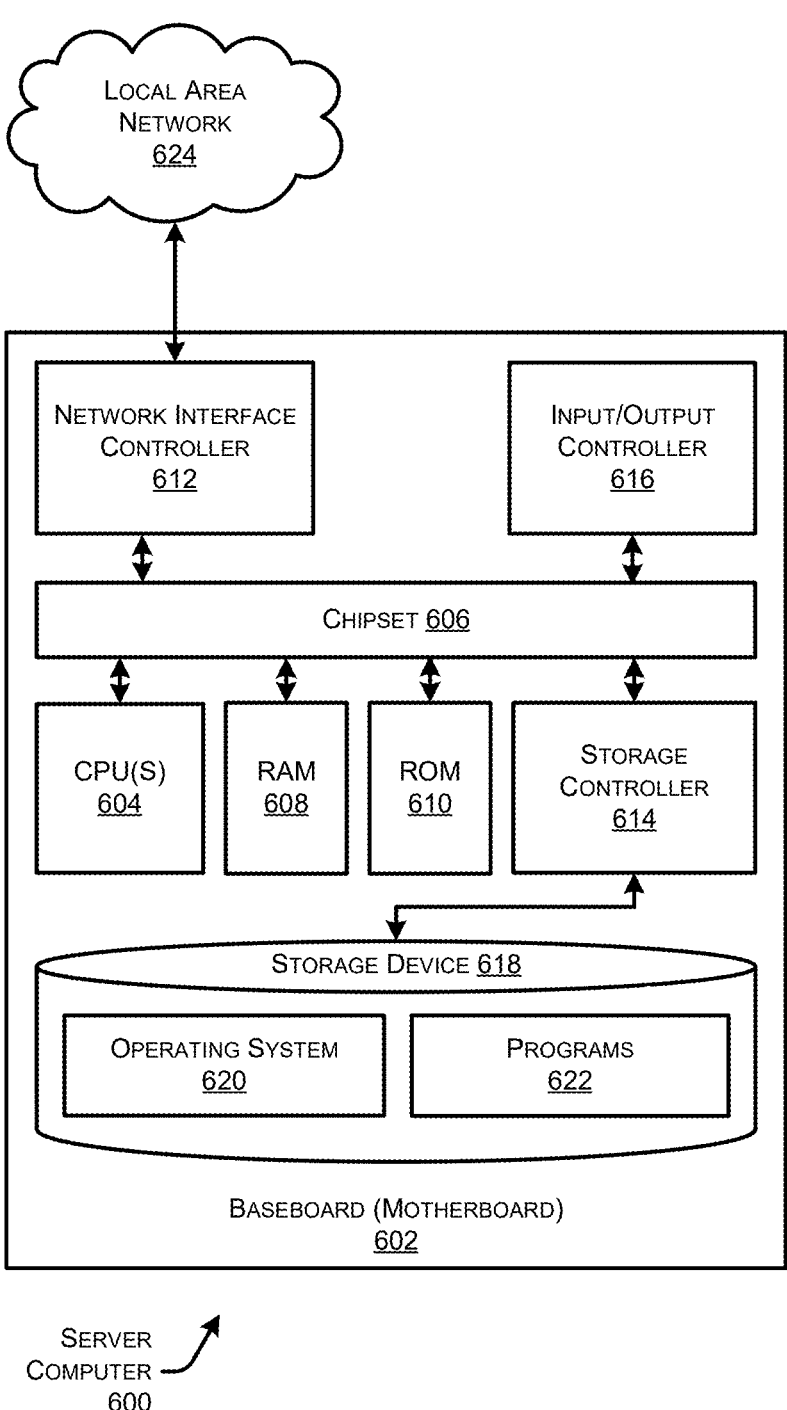
FIG. 6 is a computer architecture diagram showing an illustrative computer hardware architecture for implementing a server device that can be utilized to implement aspects of the various technologies presented herein.

FIG. 6 shows an example computer architecture for a computing device (or network routing device) 600 capable of executing program components for implementing the functionality described above. The computer architecture shown in FIG. 6 illustrates a conventional server computer, workstation, desktop computer, laptop, tablet, network appliance, e-reader, smartphone, or other computing device, and can be utilized to execute any of the software components presented herein. The computing device 600 may, in some examples, correspond to a network device such as fabric edge node 108 or fabric edge node 110, the client device 104, the binding database 114, the packet switching system 400, and/or the node 500 described herein with respect to FIGS. 1, 4 and 5, respectively.

The computing device 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computing device 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adderssubtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computing device 600. The chipset 606 can further provide an interface to a computer-readable storage medium such as a read-only memory ("ROM") 610 or non-volatile RAM ("NVRAM") for storing basic routines that help to startup the computing device 600 and to transfer information between the various components and devices. The ROM 610 or NVRAM can also store other software components necessary for the operation of the computing device 600 in accordance with the configurations described herein.

The computing device 600 can operate in a networked environment using logical connections to remote computing devices and computer systems through a network, such as the network 624. Network 624 may, in some examples, correspond to the Network fabric 102 of FIG. 1 or the network fabric 202 of FIG. 2. The chipset 606 can include functionality for providing network connectivity through a NIC 612, such as a gigabit Ethernet adapter. The NIC 612 is capable of connecting the computing device 600 to other computing devices over the network 624. It should be appreciated that multiple NICs 612 can be present in the computing device 600, connecting the computer to other types of networks and remote computer systems.

The computing device 600 can be connected to a storage device 618 that provides non-volatile storage for the computing device 600. The storage device 618 can store an operating system 620, programs 622, and data, which have been described in greater detail herein. The storage device 618 can be connected to the computing device 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computing device 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 600 can further read information from the storage device 618 by detecting the physical states or characteristics of one or more particular locations within the physical storage units.

In addition to the mass storage device 618 described above, the computing device 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 600. In some examples, the operations performed by the binding database 114, the fabric edge node 108, the fabric edge node 110, auto energizing infrastructure 112, and or any components included therein, may be supported by one or more devices similar to computing device 600. Stated otherwise, some or all of the operations performed by the binding database 114, the fabric edge node 108, the fabric edge node 110, or any components included therein, may be performed by one or more computing device 600 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computing device 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the computing device 600.

In one embodiment, the storage device 618 or other computer-readable storage media is encoded with computer-executable instructions which, when loaded into the computing device 600, transform the computer from a general-purpose computing system into a special-purpose computer capable of implementing the embodiments described herein. These computer-executable instructions transform the computing device 600 by specifying how the CPUs 604 transition between states, as described above. According to one embodiment, the computing device 600 has access to computer-readable storage media storing computer-executable instructions which, when executed by the computing device 600, perform the various processes described above with regard to FIG. 6. The computing device 600 can also include computer-readable storage media having instructions stored thereupon for performing any of the other computer-implemented operations described herein.

The computing device 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computing device 600 might not include all of the components shown in FIG. 6, can include other components that are not explicitly shown in FIG. 6, or might utilize an architecture completely different than that shown in FIG. 6.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method performed at least in part by a binding database, the method comprising:

receiving an indication of overlay address-to-underlay address binding for a client device connected to an enterprise network fabric, the indication received in a secure message from a fabric edge node through which the client device has accessed the enterprise network fabric, the overlay address-to-underlay address binding indicating a first overlay address and an underlay address associated with the fabric edge node;

allocating one or more additional overlay addresses and associating the one or more additional overlay addresses with the overlay address-to-underlay address binding of the client device such that each of the one or more additional overlay addresses are mapped to the first overlay address wherein the one or more additional overlay addresses include one or more IP blocks; and assigning a second overlay address, from the one or more additional overlay addresses, to the client device for an Internet Protocol (IP) flow to a destination, wherein the fabric edge node intercepts packets of the IP flow from the client device to the destination and translates a source IP from the first overlay address to the second overlay address.

2. The method of claim 1, wherein the second overlay address is allocated by the binding database for a first IP flow to a first destination and further comprising assigning, by the binding database, a third overlay address, from the one or more additional overlay addresses, for a second IP flow to a second destination.

3. The method of claim 1, further comprising:

receiving a query from the fabric edge node, the query indicating an IP packet destination address associated with the second overlay address; and transmitting an indication that the second overlay address is associated with the first overlay address such that the fabric edge node can translate the destination address from the second overlay address to the first overlay address and route the IP packet to the client device.

4. The method of claim 1, wherein the one or more additional overlay addresses are a set of IP blocks, IP prefixes, of a collection of IPs that are reserved in the enterprise network fabric for ephemeral overlay addresses.

5. The method of claim 1, wherein the binding database maps the second overlay address to the first overlay address.

6. The method of claim 1, wherein the binding database maps the second overlay address to the underlay address.

7. The method of claim 1, wherein the fabric edge node intercepts packet of the IP flow from the client device to the destination based on a Policy Based Rule (PBR).

8. A system comprising:

one or more processors; and one or more non-transitory computer-readable media storing computer-executable instructions that, when executed by the one or more processors, cause the one or more processors to perform operations comprising:

receiving, by a binding database, an indication of an Endpoint Identifier to Routing Locator (overlay address-to-underlay address) binding for a client device connected to an enterprise network fabric, the indication received in a secure message from a fabric edge node through which the client device has accessed the enterprise network fabric, the overlay address-to-underlay address binding indicating a first overlay address and an underlay address associated with the fabric edge node;

allocating, by the binding database, one or more additional overlay addresses and associating the one or more additional overlay addresses with the overlay address- to-underlay address binding of the client device such that each of the one or more additional overlay addresses are mapped to the first overlay address wherein the one or more additional overlay addresses include one or more IP blocks; and assigning, by the binding database, a second overlay address, from the one or more additional overlay addresses, to the client device for an Internet Protocol (IP) flow to a destination, wherein the fabric edge node intercepts packets of the IP flow from the client device to the destination and translates a source IP from the first overlay address to the second overlay address.

9. The system of claim 8, wherein the second overlay address is allocated by the binding database for a first IP flow to a first destination and further comprising assigning, by the binding database, a third overlay address, from the one or more additional overlay addresses, for a second IP flow to a second destination.

10. The system of claim 8, the operations further comprising:

receiving a query from the fabric edge node, the query indicating an IP packet destination address associated with the second overlay address; and transmitting an indication that the second overlay address is associated with the first overlay address such that the fabric edge node can translate the destination address from the second overlay address to the first overlay address and route the IP packet to the client device.

11. The system of claim 8, wherein the one or more additional overlay addresses are a collection of IPs that are reserved in the enterprise network fabric for ephemeral overlay addresses.

12. The system of claim 8, wherein the binding database maps the second overlay address to the first overlay address.

13. The system of claim 8, wherein the binding database maps the second overlay address to the underlay address.

14. The system of claim 8, wherein the fabric edge node intercepts packet of the IP flow from the client device to the destination based on a Policy Based Rule (PBR).

15. One or more non-transitory computer-readable media storing instructions that, when executed, cause one or more processors to perform operations comprising:

receiving, by a binding database, an indication of an Endpoint Identifier to Routing Locator (overlay address-to-underlay address) binding for a client device connected to an enterprise network fabric, the indication received in a secure message from a fabric edge node through which the client device has accessed the enterprise network fabric, the overlay address-to-underlay address binding indicating a first overlay address and an underlay address associated with the fabric edge node;

allocating, by the binding database, one or more additional overlay addresses and associating the one or more additional overlay addresses with the overlay address-to- underlay address binding of the client device such that each of the one or more additional overlay addresses are mapped to the first overlay address wherein the one or more additional overlay addresses include one or more IP blocks; and assigning, by the binding database, a second overlay address, from the one or more additional overlay addresses, to the client device for an Internet Protocol (IP) flow to a destination, wherein the fabric edge node intercepts packets of the IP flow from the client device to the destination and translates a source IP from the first overlay address to the second overlay address.

16. The one or more non-transitory computer-readable media of claim 15, wherein the second overlay address is allocated by the binding database for a first IP flow to a first destination and further comprising assigning, by the binding database, a third overlay address, from the one or more additional overlay addresses, for a second IP flow to a second destination.

17. The one or more non-transitory computer-readable media of claim 15, the operations further comprising:

receiving a query from the fabric edge node, the query indicating an IP packet destination address associated with the second overlay address; and transmitting an indication that the second overlay address is associated with the first overlay address such that the fabric edge node can translate the destination address from the second overlay address to the first overlay address and route the IP packet to the client device.

18. The one or more non-transitory computer-readable media of claim 15, wherein the binding database maps the second overlay address to the first overlay address.

19. The one or more non-transitory computer-readable media of claim 15, wherein the binding database maps the second overlay address to the underlay address.

20. The one or more non-transitory computer-readable media of claim 15, wherein the fabric edge node intercepts packet of the IP flow from the client device to the destination based on a Policy Based Rule (PBR).

\* \* \* \* \*